United States Patent
Mouissie

(12)
(10) Patent No.: US 6,648,701 B2
(45) Date of Patent: Nov. 18, 2003

(54) BATTERY CLAMP

(75) Inventor: Bob Mouissie, Berlicum (NL)

(73) Assignee: Harting Automotive GmbH & Co. KG (DE)

( * ) Notice: Subject to any disclaimer, the term of this patent is extended or adjusted under 35 U.S.C. 154(b) by 0 days.

(21) Appl. No.: 09/998,974

(22) Filed: Oct. 31, 2001

(65) Prior Publication Data

US 2002/0076997 A1 Jun. 20, 2002

(30) Foreign Application Priority Data

Dec. 14, 2000 (DE) .................... 200 21 126 U

(51) Int. Cl.$^7$ ................................ H01R 4/28
(52) U.S. Cl. ....................... 439/761; 439/760
(58) Field of Search ................. 439/754–765

(56) References Cited

U.S. PATENT DOCUMENTS

| | | | | |
|---|---|---|---|---|
| 1,746,514 A | * | 2/1930 | Baunach | 439/762 |
| 2,751,571 A | * | 6/1956 | Colyer | 439/756 |
| 3,568,138 A | * | 3/1971 | Bakker | 439/761 |
| 5,302,142 A | * | 4/1994 | Tabata | 439/762 |
| 5,302,143 A | * | 4/1994 | Inoue et al. | 439/762 |
| 5,316,505 A | | 5/1994 | Kipp | 439/762 |
| 5,498,178 A | * | 3/1996 | Tabata | 439/762 |
| 5,547,403 A | * | 8/1996 | Haberstroh et al. | 439/763 |

FOREIGN PATENT DOCUMENTS

| | | |
|---|---|---|
| EP | 0 466 528 | 1/1992 |
| GB | 599876 | 3/1948 |
| GB | 1 482 490 A | 8/1977 |

\* cited by examiner

*Primary Examiner*—Tho D. Ta
*Assistant Examiner*—Briggitte R Hammond
(74) *Attorney, Agent, or Firm*—Hayes Soloway P.C.

(57) ABSTRACT

A batter clamp comprises a contact ring which can be placed on a battery contact, and a terminal bolt to which a cable can be screwed. The contact ring is formed from two metal lugs each continuing into an intermediate section in which they extend in parallelism to each other and spaced from each other. Adjacent thereto, the metal lugs continue into a terminal section in which the terminal bolt is arranged. A stiffening lug is provided which starting from the terminal section extends as far as between the two intermediate sections and is connected thereto with the two metal lugs in a fashion resistant to shearing load.

8 Claims, 5 Drawing Sheets

BATTERY CLAMP

TECHNICAL FIELD

The invention relates to a battery clamp comprising a contact ring and a terminal bolt to which a cable can be screwed.

BACKGROUND OF THE INVENTION

There are battery clamps known in which the cable to be connected with the battery is fixed to the battery clamp by crimping. In other designs, a terminal bolt is used for connecting the cable. Then, a torque acts when attaching the cable. Such torque is able to be taken up with conventional battery clamps without any problem, since they usually consist of a solid metal body which has the required strength. The heavy weight in combination with the high production costs, however, is a disadvantage with such a battery clamp.

Using a bent sheet metal part instead of the solid metal body is known from battery clamps to which the cable is fixed by crimping. Such a bent sheet metal part, however, has not the required strength to take up the torque—which is introduced into the battery clamp on screwing on the cable or the nut securing the cable—without undergoing an undue deformation.

BRIEF SUMMARY OF THE INVENTION

It is the object of the invention to provide a battery clamp which with low production costs and low weight makes it possible to use a terminal bolt for the cable to be connected.

This is achieved in a battery clamp which comprises a contact ring which can be placed on a battery contact, and a terminal bolt to which a cable can be screwed. The contact ring is formed from two metal lugs each continuing into an intermediate section in which they extend in parallelism to each other and spaced from each other. Adjacent thereto, the metal lugs continue into a terminal section in which the terminal bolt is arranged. A stiffening lug is provided which starting from the terminal section extends as far as between the two intermediate sections and is connected thereto with the two metal lugs in a fashion resistant to a shearing load.

Advantageous designs of the invention will be apparent from the subclaims.

BRIEF DESCRIPTION OF THE DRAWINGS

FIG. 4 shows in a perspective view the contact ring of the battery clamp of FIG. 1 with a spring being placed on;

DETAILED DESCRIPTION OF THE PREFERRED EMBODIMENT

Figure 1:
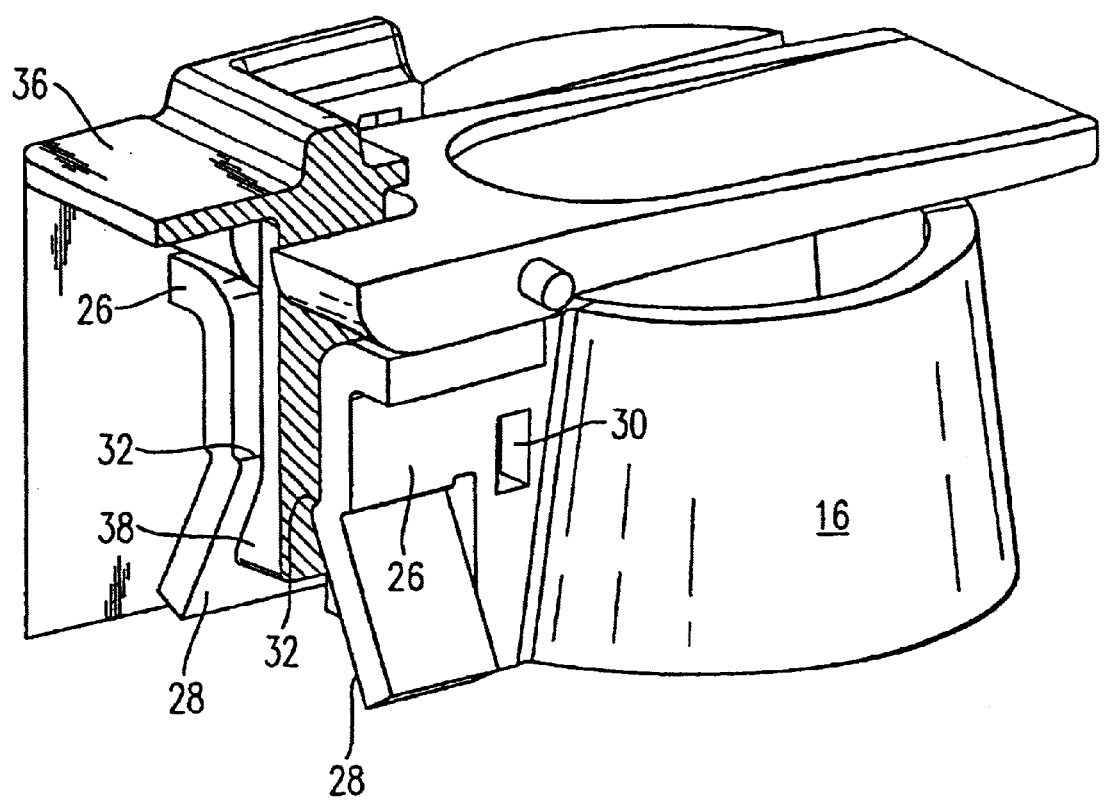
FIG. 1 shows in a perspective, partially sectioned view the battery clamp according to the invention with the terminal section having been omitted.

The central component of the battery clamp is a body 10 (see in particular FIGS. 5 and 6) configured as a bent sheet metal part. The body 10 substantially consists of two metal lugs 12, 14 extending approximately in the shape of a semicircle, so that together they form a contact ring 16 which can be placed on a battery contact. The contact ring is configured conically corresponding to the battery contact and is corrugated on its inner side for improving the grip of the contact ring on the battery contact.

Adjacent to the contact ring, the metal lugs 12, 14 each continue into an intermediate section 18 in which they extend in parallelism to each other and spaced from each other. Adjacently, the two metal lugs continue into a common terminal section 20, so that they are integrally connected with each other.

A terminal bolt 22 is affixed to the terminal section 20, by means of which bolt a cable can be screwed on the battery clamp. Affixed to the terminal section 20 is a crimped section 24 by means of which a cable can be fixed to the battery clamp by crimping.

Figure 3:
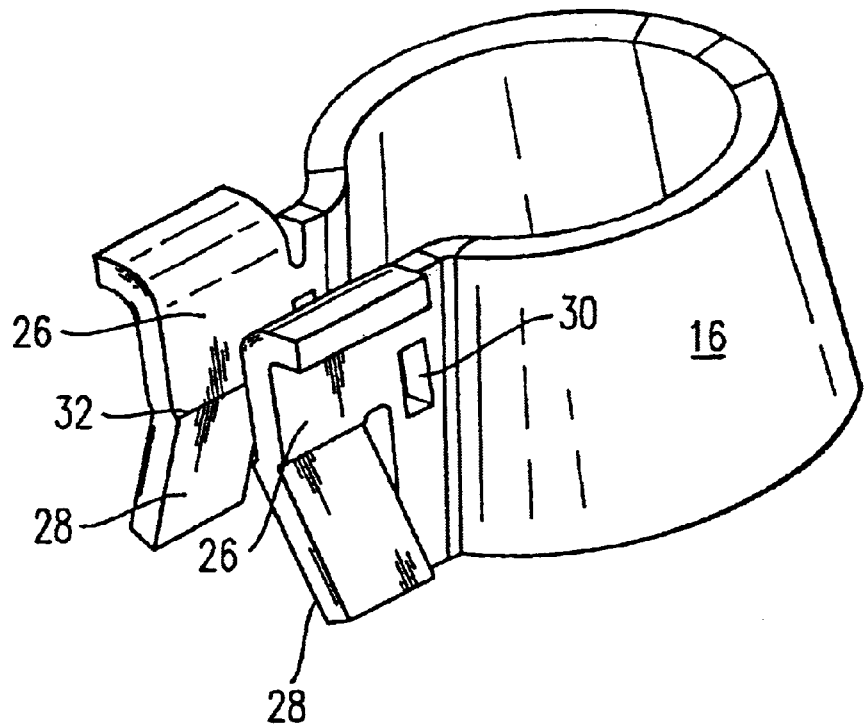
FIG. 3 shows in a perspective view the contact ring of the battery clamp of FIG. 1.

On their side facing away from the terminal section, the metal lugs 12, 14 are provided with one clamping lug 26 each (see in particular FIG. 3). Each clamping lug 26 is provided with a slope 28 as well as a recess 30. At the transition between the slope 28 and the clamping lug 26, an arresting edge 32 is formed which protrudes by about 0.3 to 0.5 mm.

Figure 4:
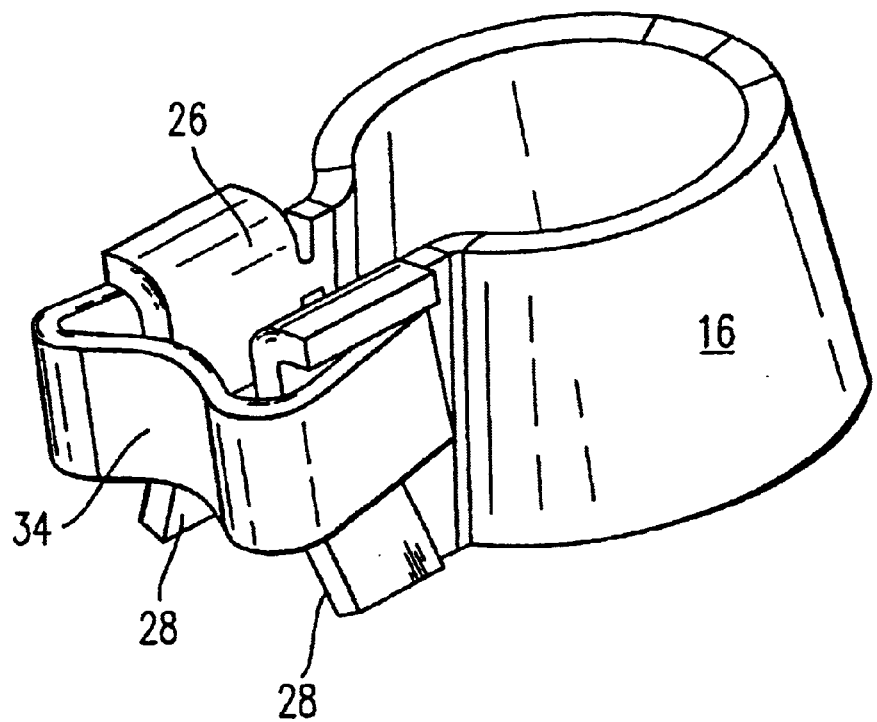

A spring 34 (see FIG. 4) engages the clamping lugs 26 of the contact ring 16, which spring tries to press the clamping lugs 26 together. In order to prevent the spring 34 from slipping off, it is provided with two projections which engage in the recesses 30 of the clamping lugs 26.

The battery clamp is provided with a covering cap 36 (see in particular FIG. 1) which covers the contact ring 16 and is pivotally supported on the body 10. The covering cap 36 is provided with a blocking wedge 38 which is integrally formed on the covering cap 36 and is positioned between the two clamping lugs 26 of the contact ring 16, which are provided with the slopes 28.

Figure 2:
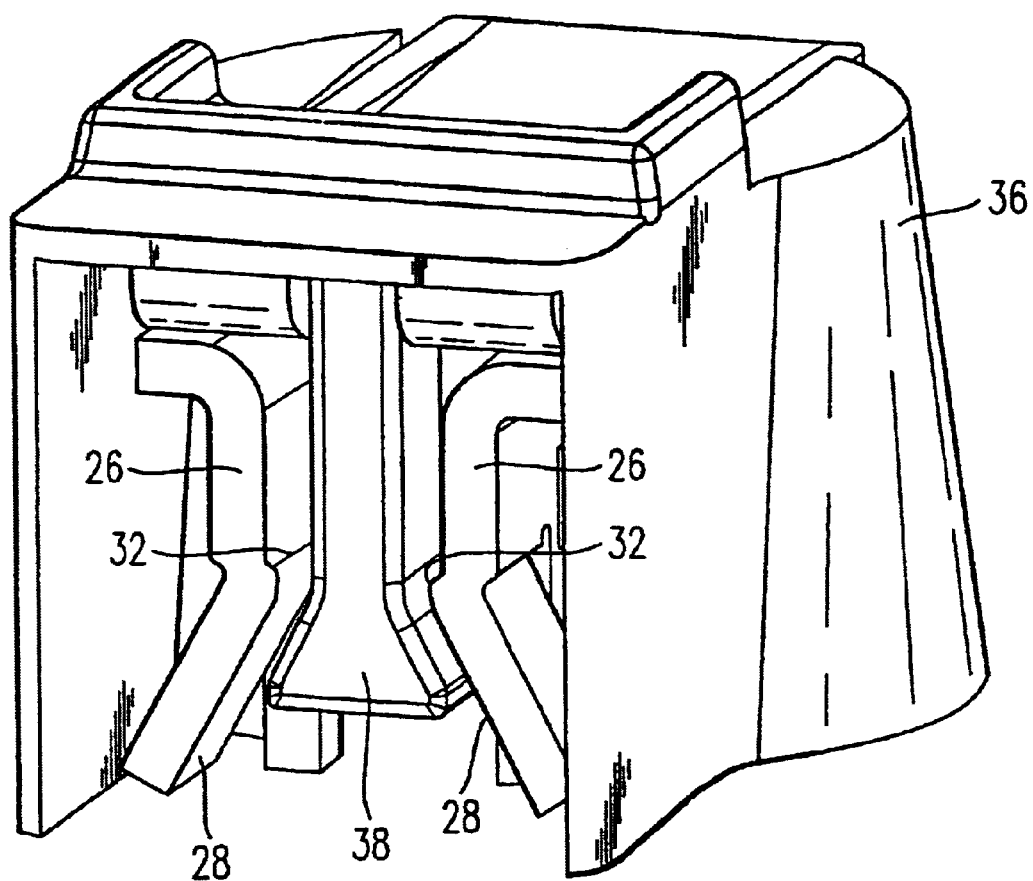
FIG. 2 shows in a further perspective view the battery clamp according to the invention.

The blocking wedge 38 together with the covering cap 36 can be shifted between a contact position which is shown in the FIGS. 1 and 2, and a mounting position which is not shown in the Figures. In the contact position, the blocking wedge is disposed in an area between the two slopes 28, where it does not touch them. Thus, the clamping ring 16 can be pulled together by means of the two clamping lugs 26. In the mounting position, the blocking wedge 38 is disposed between the two clamping lugs 26 above of the arresting edge 32, so that the clamping ring is spread and can be placed on a battery contact or pulled off from it.

The details of the structure of the covering cap and the ways and means of displacing the blocking wedge are not relevant for the comprehension of the battery clamp according to the invention, so that it is not discussed in further detail here. A detailed description is to be found in the German Patent Application 199 45 407.

In the following, the design of the body 10 is described in more detail by means of the FIGS. 5 to 7. The metal lugs 12, 14 extend in the intermediate section 18 in a plane which is approximately perpendicular to the plane in which the terminal section 20 extends. Each metal lug is provided with a recess 39 in the region of the intermediate sections (see also in FIG. 7 the recess 39' on the stamped part 10' which later is bent to form body 10).

Figure 7:
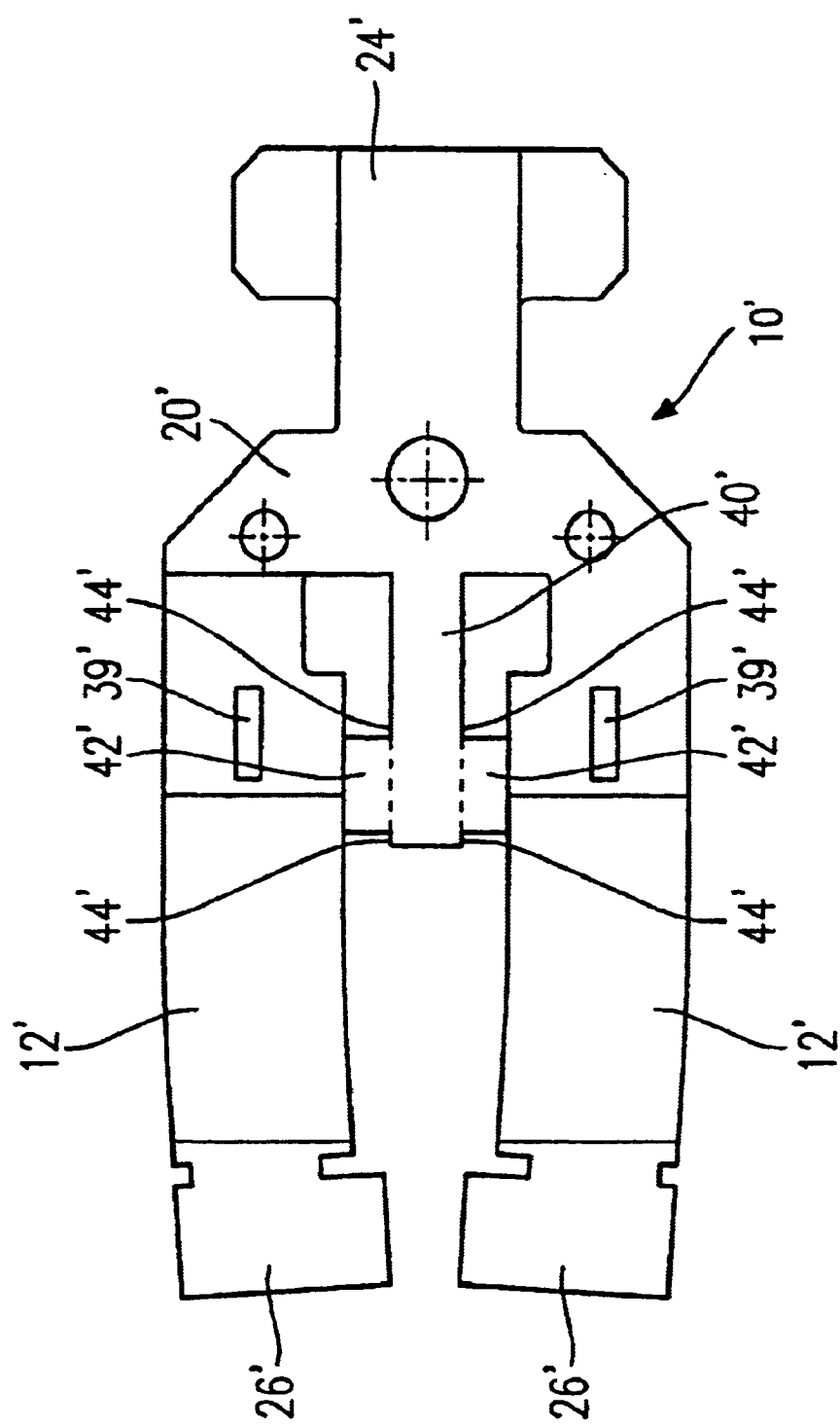
FIG. 7 shows a stamped part which can be given the shape of the body shown in FIGS. 5 and 6.

Starting from the terminal section 20 there extends a stiffening lug 40 which is cranked and comprises at its end two protrusions 42 on opposite sides (see in FIG. 7 the regions 42' delineated from the stiffening lug by the broken lines). The width of the two protrusions corresponds to the width of the recesses 39 in the intermediate section of the metal lugs 12, 14, whilst the height of the recesses 39 corresponds to the thickness of the material of the stiffening lug. Thus, each protrusion 42 can be received with a snug fit in one of the recesses 39. The height of the two protrusions is larger than the thickness of the material of the metal lugs. Those sections of the stiffening lugs which are situated next to the protrusions 42 form support surfaces 44.

In FIG. 7 there can be seen that the stiffening lug can be formed in a cost-effective manner between the two metal lugs 12', 14' from material which otherwise had to be discarded.

Figure 5:
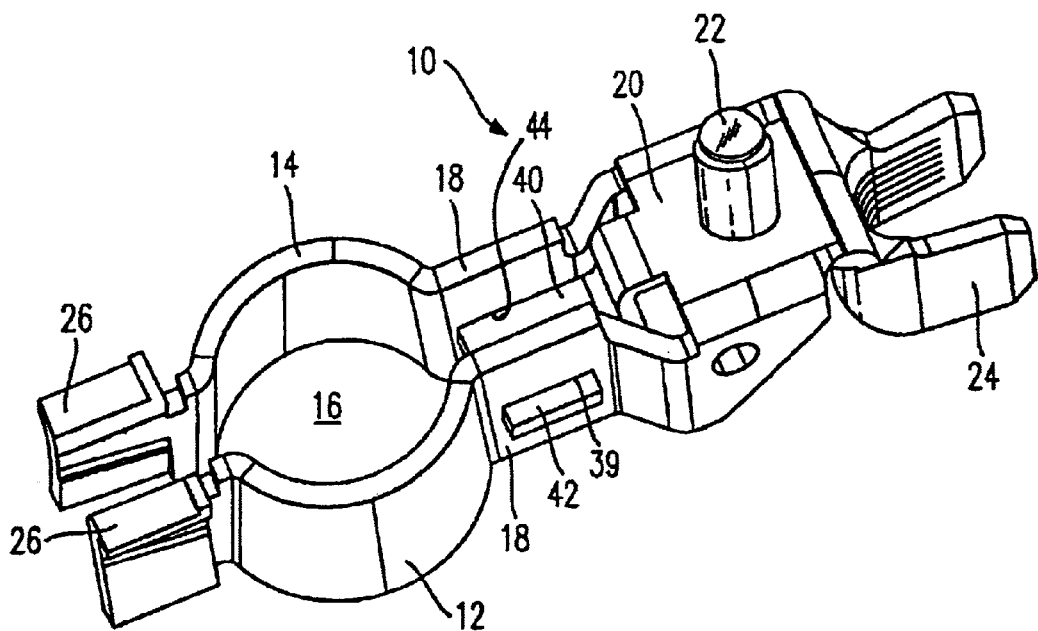
FIG. 5 shows in a perspective top view the body of the battery clamp.
Figure 6:
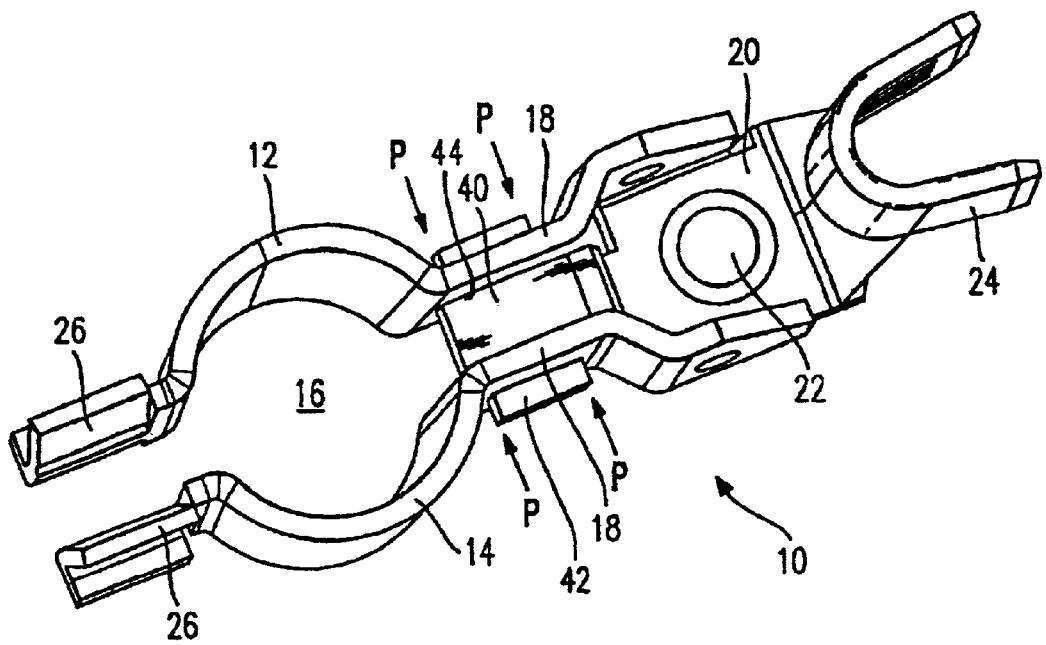
FIG. 6 shows in a perspective bottom view the body of the battery clamp.

As can be seen in FIGS. 5 and 6, the protrusions 42 of the stiffening lug 40 are put through the recesses 39 in the intermediate sections of the metal lugs, so that the support surfaces 44 of the stiffening lug 40 rest at the inner side of the metal lugs and the protrusions project beyond the outer side of the metal lugs. Then, the protrusions 42 on the outer side of the metal lugs are disturbed, caulked, crimped or plastically deformed in another way (indicated in FIG. 6. by arrows P), preferably at their outer edges and in a direction perpendicular to the plane defined by them, so that they cannot pass through the recesses any more. With this, the stiffening lug 40 is connected with the two metal lugs in a fashion resistant to a shearing load, for preventing the two metal lugs from being displaced parallel to each other as it is tried to be brought about by a torque applied onto the terminal bolt. Now there can be applied a high torque onto the terminal bolt on screwing on of a cable without any danger of an undue deformation of the body 10 of the battery clamp.

According to an alternative design which is not shown in the drawings, the stiffening lug can also be configured planar, i.e. not cranked. It then extends starting from the terminal section of the battery clamp obliquely downwards into the region of the intermediate sections. The recesses for receiving the protrusions are likewise oriented obliquely, so that an imaginary prolongation of them will extend through the edge of the terminal section directing towards the contact ring.

In this alternative, the stiffening lug is configured to be slightly shorter than in the embodiment shown, as it is not cranked and, hence, does not extend bent two times, but only bent one time. The advantage with respect to the embodiment shown in the Figures is that the stiffening lug has to be bent only one single time, namely at the transition to the terminal section.

What is claimed is:

1. A battery clamp comprising a contact ring which can be placed on a battery contact, and a terminal bolt to which a cable can be screwed, said contact ring being formed from two metal lugs each continuing into an intermediate section in which they extend in parallelism to each other and spaced from each other, and adjacent thereto continue into a terminal section in which said terminal bolt is fixedly connected to said terminal section, a stiffening lug being provided which starting from said terminal section extends as far as between said two intermediate sections and is connected thereto with said two metal lugs in a fashion resistant to a shearing load.

2. The battery clamp according to claim 1, wherein said two metal lugs extend in a region of said intermediate section in a plane which is approximately perpendicular to a plane of said terminal section.

3. The battery clamp according to claim 1, wherein said terminal section is provided with a crimped section in which said cable can be fixed by crimping.

4. The battery clamp according to claim 1, wherein said stiffening lug extends in a region of said intermediate section so as to be parallel to said terminal section.

5. The battery clamp according to claim 1, wherein said stiffening lug extends in a region of said intermediate sections so as to be disposed in part obliquely to a plane of said terminal section.

6. The battery clamp according to claim 1, wherein each metal lug has a recess in a region of its intermediate section and where said stiffening lug is provided with two protrusions extending through said recesses.

7. The battery clamp according to claim 6, wherein said protrusions are plastically deformed on an outer side of said metal lugs, so that said stiffening lug is fixedly connected with said two metal lugs.

8. The battery clamp according to claim 6, wherein a support surface is provided on said stiffening lug on both sides of said protrusions, said support surface resting at an inner side of said metal lugs.

\* \* \* \* \*